…

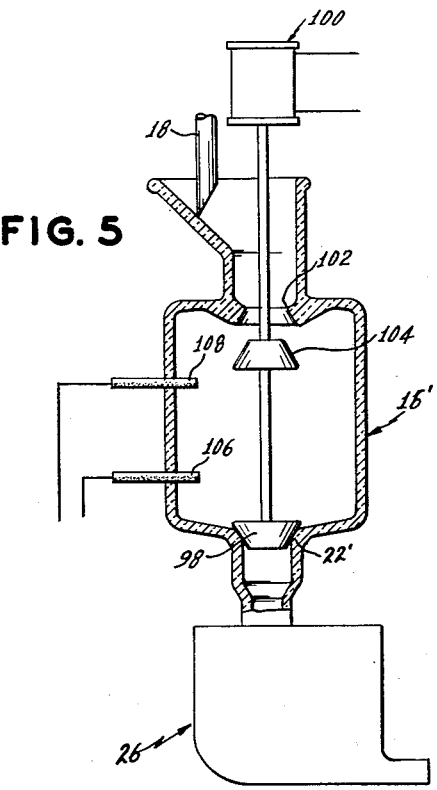
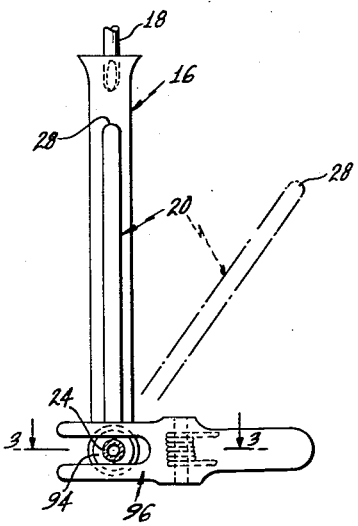
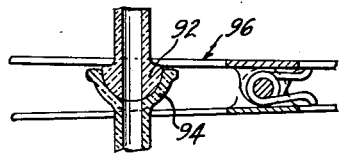
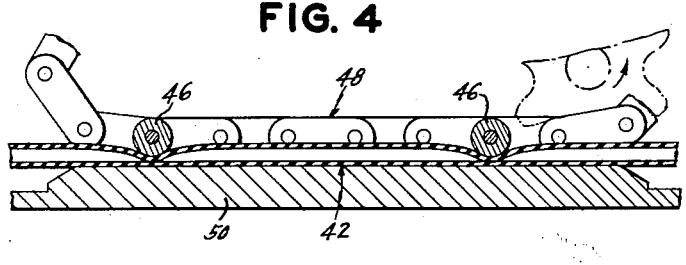

United States Patent Office 3,010,800
Patented Nov. 28, 1961

3,010,800
ANALYSIS AND RECORDING APPARATUS
Edwin C. Whitehead, Crestwood, Andrés Ferrari, Jr., Scarsdale, and Jack Isreeli, Tuckahoe, N.Y., assignors to Technicon Chromatography Corporation, Chauncey, N.Y., a corporation of New York
Filed Oct. 9, 1956, Ser. No. 614,949
7 Claims. (Cl. 23—253)

The present invention relates to analysis and recording apparatus, and while useful for other purposes, is intended primarily for use in the art of chromatographic analysis.

The primary object of the present invention is to provide a new and improved method and apparatus for analyzing individual fractions of liquid, wherein each fraction is of predetermined volume consisting of a collection of liquid drops or other small volumes of liquid, as for example fractions of liquid obtained from a chromatographic column.

Pursuant to the present invention, instead of collecting the fractions in a series of test tubes and thereafter colorimetrically examining the liquid in each test tube separately, the present invention enables the series of fractions of liquid derived from the chromatographic column, or from other sources in the case of other applications of this invention, to be colorimetrically analyzed automatically, seriatim, by flowing said fractions one after another as they are formed to a colorimeter. The latter is preferably provided with a flow cell, and a recorder is operated under the control of the colorimeter for providing a record of the colorimetric analysis of the series of fractions.

The above and other objects, features and advantages of the invention will be fully understood from the following description considered in connection with the accompanying illustrative drawings.

In the drawings:

FIG. 2 is a sectional view on the line 2—2 of FIG. 1;

FIG. 3 is a sectional view on the line 3—3 of FIG. 2;

FIG. 4 is a sectional view on the line 4—4 of FIG. 1; and

FIG. 5 is a sectional view of a liquid receiver which may be employed pursuant to a modification of this invention.

Figure 1:
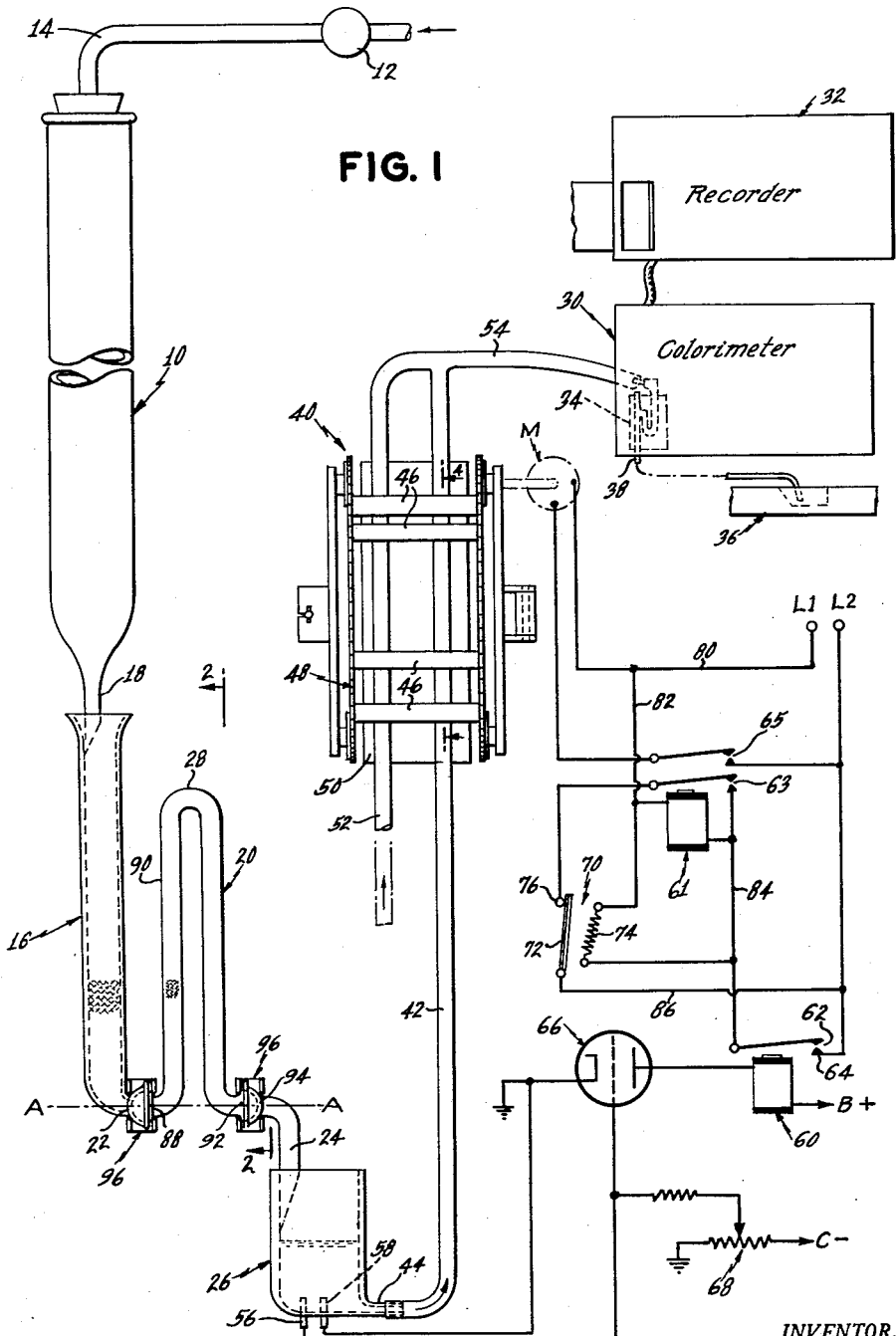
FIG. 1 is a more or less diagrammatic view of the presently preferred embodiment of the invention, and illustrates some of the instruments utilized in the practice of this invention pursuant to this embodiment.

Referring now to the drawings in detail, the apparatus of the present invention is shown in association with a chromatography column 10 supplied at its top with liquid pumped under pressure into said column by a liquid pump 12 connected to the top of said column by a pipe 14. It will be understood that in accordance with conventional practice in chromatography analysis, the liquid to be analyzed is introduced into the tube of the column 10, through the upper end thereof, before the solvent is introduced into the column by the pump 12. More specifically, the components of the liquid to be analyzed stratify in the column according to the degree of affinity of each of the several components of the adsorbent material in the column and form layers of adsorbates in the order of their respective affinities from top to bottom of the column, the adsorbate of highest affinity being uppermost in the column. Thereafter a solvent or eluting liquid is continuously applied during the operation of the pump 12 through the tube 14 to the upper end of the tube, and the resultant eluents pass through the outlet 18 and into a receiver 16, and is handled as hereinafter more specifically described.

Said column is disposed vertically above that receiver 16 here shown as a vertically positioned glass tube, into which the drops or small quantities of liquid from the outlet 18 of the chromatography column are received. A siphon 20 in the form of a U-tube made of glass or other suitable material is connected to the lower or outlet end 22 of receiver 16. The outlet 24 of the siphon is arranged to discharge the liquid, upon operation of the siphon, into a second receiver 26. It will be understood that when the level of the liquid in receiver 16 rises to the level of the top bend 28 of the siphon, the siphon will immediately discharge the contents of receiver 16 into receiver 26. Thus, it will be observed that receiver 16 provides means for collecting the drops or other small volumes of liquid from the chromatography column to form an integrated and predetermined larger volume according to the cross sectional area of the receiver 16 and the vertical position of the bend 28 of the siphon so that an accurately predetermined discrete volume of liquid considerably larger than the constituent drops or small volumes collected in receiver 16 between successive operations of the siphon is transmitted to the receiver 26, and this operation is repeated at intervals depending upon the length of time required for the rise of the liquid in receiver 16 to the discharge level of the siphon.

Provision is made for transmitting each volume of liquid which is discharged into receiver 26 by siphon 20 to a colorimeter indicated diagrammatically at 30 which is arranged to operate an electrically actuated recorder indicated diagrammatically at 32. Said colorimeter may be of any suitable type for example, as shown in our U.S. patent application of Serial No. 548,037, filed November 21, 1955. The flow cell of the colorimeter is indicated diagrammatically at 34. A multi-compartment turntable or fraction collector rack 36 may be disposed below the outlet 38 of the flow cell of the colorimeter so that the fractions together with the liquid reagent added thereto, as will presently be described, may be received and collected storage or reference. For this purpose, the fraction collector shown in the United States Patent to Gorham No. 2,604,248 may be employed, the chromatography column and its support illustrated in said patent being omitted.

A pump 40 is provided for transmitting the predetermined volumes of liquid collected in receiver 26 to the colorimeter, and at the same time to transmit a liquid reagent for mixture with liquid to be analyzed. The pump is preferably of the type in which resiliently compressible tubes are compressed progressively along their length in the pumping action. Thus, as here shown, a tube 42 formed of "Tygon" or other resiliently compressible material is connected to the outlet 44 of receptacle 26 and is acted upon by a series of compressing rollers 46 carried by an endless conveyor 48 and operable to compress the tube against a plate 50 (FIG. 3). A similar tube 52 is connected to a supply of liquid reagent (not shown) and is operated upon by said pump for transmitting said reagent to a tube 54 for treating the liquid from receiver 26 to condition it for colorimetric analysis. It will be understood that a water bath or other suitable heater (not shown) may be provided in the fluid line to the colorimeter in case heating of the liquids are necessary for properly conditioning the liquid for such analysis. It will be understood that the diameters of tubes 42 and 52 may be different from each other so that pump 40 will operate as a proportioning pump to supply the quantity of reagent in a predetermined proportion to the quantity of liquid pumped through tube 42.

Provision is made for operating the pump 40 intermittently as needed, for emptying each volume of liquid from receiver 26 as soon as the liquid is discharged from the first receiver 16 by operation of the siphon 20. For this purpose the motor M which drives the pump 40 is operated under the control of the liquid in receiver 26. As here shown, a pair of spaced electric terminals 56 and 58 suitably insulated from each other are provided at the bottom of receiver 26 so that when liquid is present in said receiver electric relays 60 and 61 are energized for completing a circuit, at the normally open relay contacts 62, 64 of relay 60 and at the companion contacts of the contact sets 63 and 65, respectively, of relay 61, to the motor M from an electric source indicated by the line terminals L1 and L2. The relay 60 is a sensitive D.C. relay operated under the control of a resistance trigger circuit which includes the triode 66 and the conventional electrical connections illustrated, it being noted that the winding of relay 60 is disposed in the plate circuit of said triode. Thus, when as is frequently the case the liquid from the chromatography column has a high resistance, the relay 60 will nevertheless be operated due to the decrease in the grid bias when the control terminals 56 and 58 are bridged by the liquid in receiver 26. It will be observed that the trigger circuit includes an adjustable resistance 68 for adjusting the grid bias level in the non-conducting condition of triode 66.

The time delay relay 70 is provided in the control circuit so that the pump motor M will continue to operate, pursuant to the energization of relays 60 and 61, until all of the volume of liquid discharged into receiver 26 at each operation of the siphon 20 is pumped to the colorimeter 30. Said time delay relay may be of any suitable type, and as here shown comprises a bimetal thermostatic strip 72 and an electric heater 74 therefor. It will be understood that the time delay relay may be adjusted to predetermine the length of time bimetal 72 remains in contact with the companion rupture contact 76 of the relay and thereafter disengaged pursuant to the heating and consequent deflection of said bimetal for interrupting the circuit at contact 76 after a predetermined period of energization of the relay heat 74. It will be observed that as soon as relay 61 is energized at the operation of relay 60, the motor M is connected directly to the line terminals L1, L2 and that at the same time a circuit from L1, L2 is completed through the relay heater 74 through the contacts of relay 60, and that a holding or "stick" circuit is completed through the winding of relay 61 independently of the contacts 62, 64 of relay 60. Said holding circuit may be traced from line terminal L1 by way of wires 80 and 82 to one end of the relay winding 61 from the other end of said relay winding by way of wire 84 to the closed companion contacts 63 of relay 61 to the bimetal 72 which is then engaged with rupture contact 76 and from said bimetal by wire 86 to the terminal L2. Thus, the pump motor will continue to operate for the length of time set according to the adjustment of the time delay relay 70 whether or not relay 60 remains energized, after it is once energized by the bridging of the control contacts 56, 58. However, in the event that the time delay relay should open, for some unforeseen reason, after the relay 60 is energized but before the volume of liquid is completely pumped out of the receiver 26, the motor will nevertheless continue to operate so long as the contacts 62, 64 of relay 60 are closed. In other words, once relay 60 is energized, the motor M will operate for its intended purpose except only if the relay 60 is deenergized and the time delay relay 70 fails to operate properly and the circuit is interrupted at the contacts 72, 76.

It will be understood that pump 40 is operable to pump each volume of liquid from the receiver 26 to the colorimeter 30 in a much shorter time than it takes for the predetermined volume to collect in receiver 16. It will also be understood that the drops or small volumes of liquid which may flow into receiver 16 during the discharge operation of the siphon is negligibly small.

The siphon 20 is preferably adjustable, pursuant to the invention of Jack Isreeli one of the joint inventors herein, so that the quantity of liquid which may be collected in the receiver 16 before being emptied into the receiver 26 can be varied and accurately predetermined. For this purpose the siphon 20 is movable to various positions about the horizontal axis A—A so as to position the top bend 28 at different desired levels in relation to the vertically disposed receiver 16. Referring in this connection to FIGURE 2 of the drawings, it will be observed that the siphon may be moved from the vertical upright position shown in full lines in FIG. 2 to any one of a series of positions at an angle to the vertical axis of receiver 16 to vary the height of bend 28 of the siphon and thereby vary the level at which liquid collected in receiver 16 will be discharged therefrom. The adjustability of siphon 20 is attained by connecting the lower end 88 of the up leg 90 of the siphon in fluid-tight pivotal relation to the lower or outlet end 26 of receiver 16. More particularly, parts 22 and 88 constitute interfitting spherical or similar portions which can be movably and releasably connected to each other in relatively adjustable relation. A similar connection is provided between the outlet portion 24 of the down leg of the siphon and the end portion 92 of the U-tube of the siphon, and by reference to FIGS. 1 and 2 it will be observed that the joint forming parts 22, 88 and 92, 94 are releasably held in fluid tight and releasably assembled relation by the companion spring pressed clamps 96. The joint 92, 94 may be omitted and the down leg portion 24 may be integral with the other portion of said down leg without substantially interfering with adjustability of the siphon by movement at the joint 22, 88, but joint 92, 94 is preferred as it enables portion 24 of the siphon to be vertically positioned irrespective of the angular position of the rest of the siphon.

Referring now to FIG. 5 of the drawings, there is shown a modification within the broad scope of the present invention. It is to be noted that in lieu of the siphon 20 other suitable means may be provided for collecting the drops or other small quantities of liquid to a predetermined volume before the latter is discharged to the receiver 26 for transmission to the colorimeter. As here shown the receiver 16' is provided with an outlet 22' controlled by a valve 98 which may be opened by a solenoid 100. The inlet for receiver 16' which is in communication with the outlet 18 of the chromatography column is indicated at 102 and as here shown a valve 104 may be provided for said inlet. It will be understood that normally, that is, during the collection of the liquid drops in receiver 16' valve 98 is closed and valve 104 is open, as illustrated, and that when solenoid 100 is energized the outlet valve 98 is opened and the inlet valve 104 is closed. Control terminals 106 and 108 suitably electrically insulated from each other are arranged in vertically spaced relation so that when the liquid in receiver 16' reaches a predetermined level solenoid 100 is energized to discharge the collected volume of liquid to the receiver 16. If desired, the tube 42 which leads to the pump 40 of (FIG. 1) could be connected directly to the outlet 22' so that in such case the liquid would be pumped directly from the receiver 16' to the colorimeter as soon as the contacts 106 and 108 are bridged by the rise of the liquid in receiver 16'. Thus, as is obvious without further illustration, contacts 106, 108 could be connected to the trigger circuit such as that shown in FIG. 1 with the inclusion of the winding of solenoid 100 in parallel with the terminals of motor M of the pump.

As the adjustable siphon hereinbefore described is the sole invention of said Jack Isreeli, as indicated above, said siphon is not being claimed per se in this application but is being made the subject matter of an application in the name of said Jack Isreeli as the inventor thereof.

It will be understood that various changes may be made in the apparatus and in the method and that equipment may be added or omitted in accordance with the uses to which the invention is put in practicing various chemical processes or the like, without departing from the underlying idea of this invention within the scope of the appended claims.

Having thus described our invention, what we claim and desire to secure by Letters Patent, is:

1. Apparatus for supplying liquid to be processed in predetermined quantities collected from a series of smaller quantities of said liquid, comprising a receiver to temporarily hold all of said series of smaller quantities of the liquid, a second receiver for the liquid, means releasably preventing the flow of liquid from said first receiver to said second receiver, means operable automatically in response to the collection of a predetermined quantity of the liquid in said first receiver to discharge said predetermined volume of liquid from said first receiver into said second receiver, pumping means for discharging from said second receiver each of said predetermined quantities before the next one is received from said first receiver, said last mentioned means comprising an electric motor for actuating said pump, a normally open electric circuit closed under the control of said liquid for controlling the starting of said motor, and a timer for controlling the period of operation of said motor whereby to interrupt the operation of said pump during each period of accumulation of said predetermined quantities, respectively, a colorimeter having a flow cell, means including said pumping means for treating said predetermined volumes of liquid for colorimetric analysis, and means for transmitting said treated liquid to said flow cell.

2. Apparatus for collecting and transmitting a series of individual, separate and distinct predetermined quantities of liquid for the processing thereof individually, comprising means to receive and temporarily hold in succession a series of discrete accumulations of liquid each composed of a series of quantities of liquid each substantially smaller than one of said predetermined quantities and for integrating said series of smaller quantities into said predetermined separate and distinct quantities, respectively, means normally isolated from said first receiving means to receive said integrated quantities of liquid individually from said first mentioned receiving means, means operable automatically in response to the integration of said smaller quantities to said predetermined quantities of liquid to place said first receiving means in communication with said second receiving means, effect the transfer thereof in succession and individually from said first receiving means to said second receiving means, a colorimeter, means operable automatically for treating each of said integrated quantities for colorimetric analysis thereof, pumping means operable automatically for transmitting said treated integrated quantities of liquid in succession to said colorimeter for colorimetric analysis thereof, a motor for actuating said pumping means, and means operable in response to the presence of said predetermined quantities of liquid, respectively, in said last mentioned receiving means for controlling the operation of said motor for actuating said pumping means.

3. Apparatus for collecting and transmitting a series of individual, separate and distinct predetermined quantities of liquid for the processing thereof individually, comprising means to receive in succession and temporarily hold a series of accumulations of liquid each composed of a series of quantities of liquid each substantially smaller than one of said predetermined quantities and for integrating said series of smaller quantities into said predetermined separate and distinct quantities, respectively, processing means for said liquid, means operable automatically in response to the integration of said smaller quantities to said predetermined quantities, respectively, to pump all of said liquid in each of said accumulations seriatim to said processing means, said last mentioned means comprising an electric motor for actuating said pump, a normally open electric circuit closed under the control of said liquid for controlling the starting of said motor, and a timer for controlling the period of operation of said motor whereby to interrupt the operation of said pump during each period of accumulation of said predetermined quantities, respectively.

4. Apparatus for collecting and transmitting a series of individual, separate and distinct predetermined quantities of liquid for the processing thereof individually, comprising means to receive in succession a series of accumulations of liquid each composed of a series of quantities of liquid each substantially smaller than one of said predetermined quantities and for integrating said series of smaller quantities into said predetermined separate and distinct quantities, respectively, means to receive said integrated quantities of liquid from said first mentioned receiving means, operable automatically in accordance with the integrated quantities of liquid to effect the transfer thereof in succession and individually from said first receiving means to said second receiving means, a colorimeter, means operable automatically for treating each of said integrated quantities for colorimetric analysis thereof, and means operable automatically for transmitting said treated integrated quantities of liquid in succession to said colorimeter for colorimetric analysis thereof, said last mentioned means comprising an electric motor for actuating said pump, a normally open electric circuit closed under the control of said liquid for controlling the starting of said motor, and a timer for controlling the period of operation of said motor whereby to interrupt the operation of said pump during each period of accumulation of said predetermined quantities, respectively.

5. Apparatus for collecting and transmitting a series of individual, separate and distinct predetermined quantities of liquid for the processing thereof individually, comprising means to receive in succession and temporarily hold a series of accumulations of liquid each composed of a series of quantities of liquid each substantially smaller than one of said predetermined quantities and for integrating said series of smaller quantities into said predetermined separate and distinct quantities, respectively, processing means for said liquid, means operable automatically in response to the integration of said smaller quantities to said predetermined quantities, respectively, to pump all of said liquid in each of said accumulations seriatim to said processing means, said last mentioned means comprising an electric motor for actuating said pump, a normally open electric circuit closed under the control of said liquid and an electric trigger device for controlling the starting of said motor, and a timer for controlling the period of operation of said motor whereby to interrupt the operation of said pump during each period of accumulation of said predetermined quantities, respectively.

6. In chromatography analysis apparatus, a chromatography column having an inlet for the eluting liquid and an outlet for the flow of the eluent in the stripping operation, a flow-cell colorimeter recorder, and a proportioning pump having a plurality of individual conduits for transmitting the eluent and a color reagent simultaneously in predetermined proportions for colorimetric treatment of the eluent for controlling the operation of the colorimeter recorder in accordance with the eluent in the colorimetric treated condition thereof, means for actuating said pump, and means for automatically interrupting the operation of said pump actuating means when the supply of eluent to the pump is interrupted.

7. In chromatography analysis apparatus, a chomatography column having an inlet for the eluting liquid and an outlet for the flow of the eluent in the stripping operation, a flow-cell colorimeter recorder, means for pumping an eluting liquid into said column and for transmitting the eluent discharged from said outlet of the column for colorimetric treatment, second pumping means including a proportioning pump having a plurality of individual conduits for transmitting the eluent and a color reagent simultaneously in predetermined proportions for colorimetric treatment of the eluent for controlling the operation of the colorimeter recorder in accordance with the eluent in the colorimetric treated condition thereof, means for actuating said pump, and means for automatically interrupting the operation of said proportioning pump actuating means when the supply of eluent to the pump is interrupted.

References Cited in the file of this patent

UNITED STATES PATENTS

| | | |
|---|---|---|
| 378,811 | Tyler | Feb. 28, 1888 |
| 1,096,832 | Friese et al. | May 19, 1914 |
| 2,021,247 | Waugh | Nov. 19, 1935 |
| 2,102,282 | Roy | Dec. 14, 1937 |
| 2,328,461 | Kienle et al. | Aug. 31, 1943 |
| 2,604,248 | Gorham | July 22, 1952 |
| 2,797,149 | Skeggs | Jan. 25, 1957 |

OTHER REFERENCES

Fletcher et al.: "Instr. Soc. of Am.," vol. 9, Part 2, Sept. 13–24, 1954.